H. L. STEVENS.
HAT SHAPING AND FORMING MACHINE.
APPLICATION FILED APR. 10, 1913.
1,103,096.
Patented July 14, 1914.
5 SHEETS—SHEET 3.
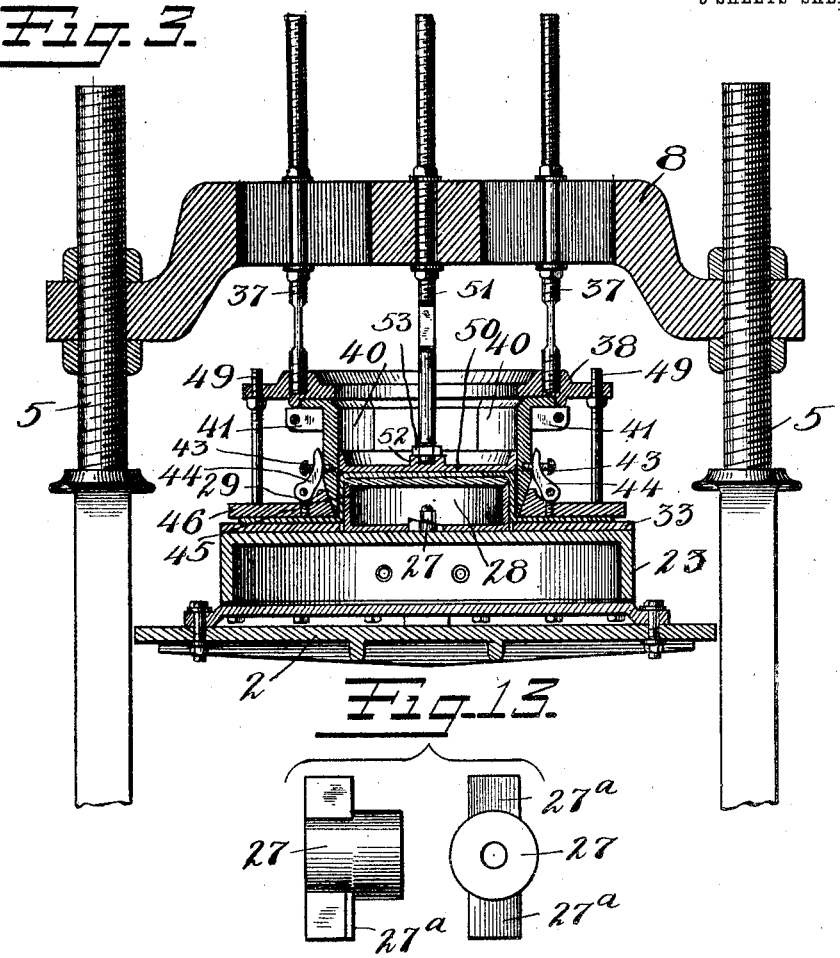
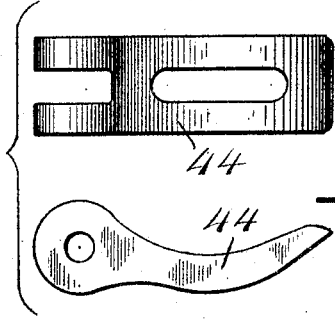
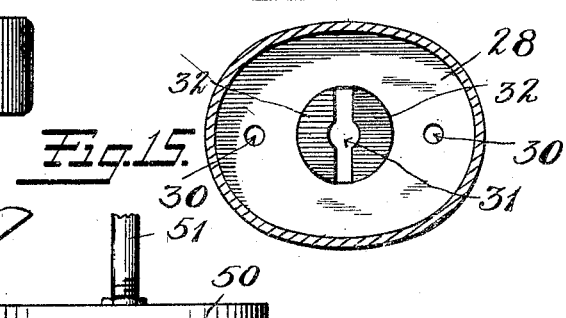
Witnesses:
Fred K. M. Dannenfelser
Chas. M. Reard
Inventor
HERBERT L. STEVENS
By his Attorneys H. L. STEVENS.
HAT SHAPING AND FORMING MACHINE.
APPLICATION FILED APR. 10, 1913.
1,103,096.
Patented July 14, 1914.
5 SHEETS—SHEET 4.
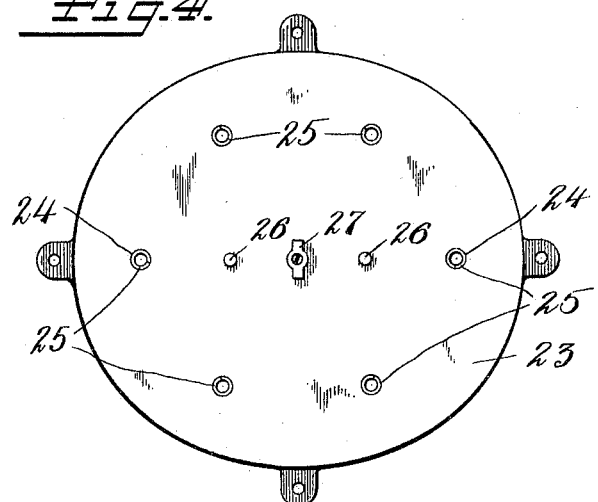
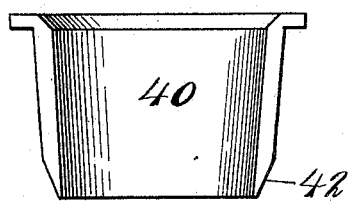
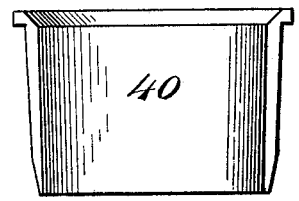
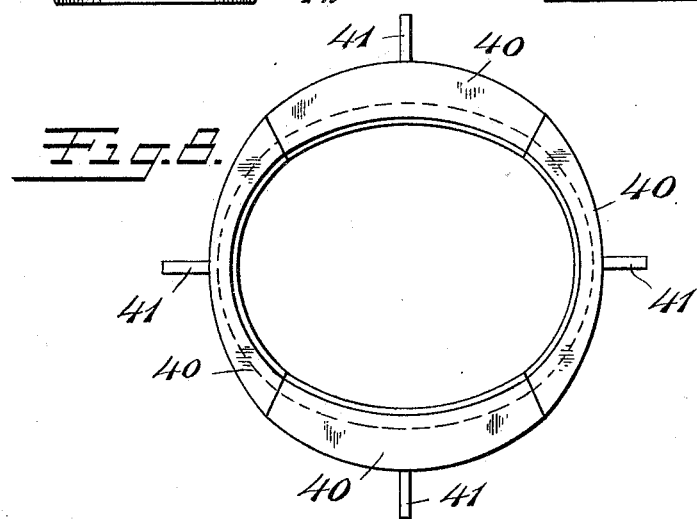
Witnesses:
Fred H. W. Dannenfelser
Chas. A. Peard
Inventor
HERBERT L. STEVENS
By his Attorneys

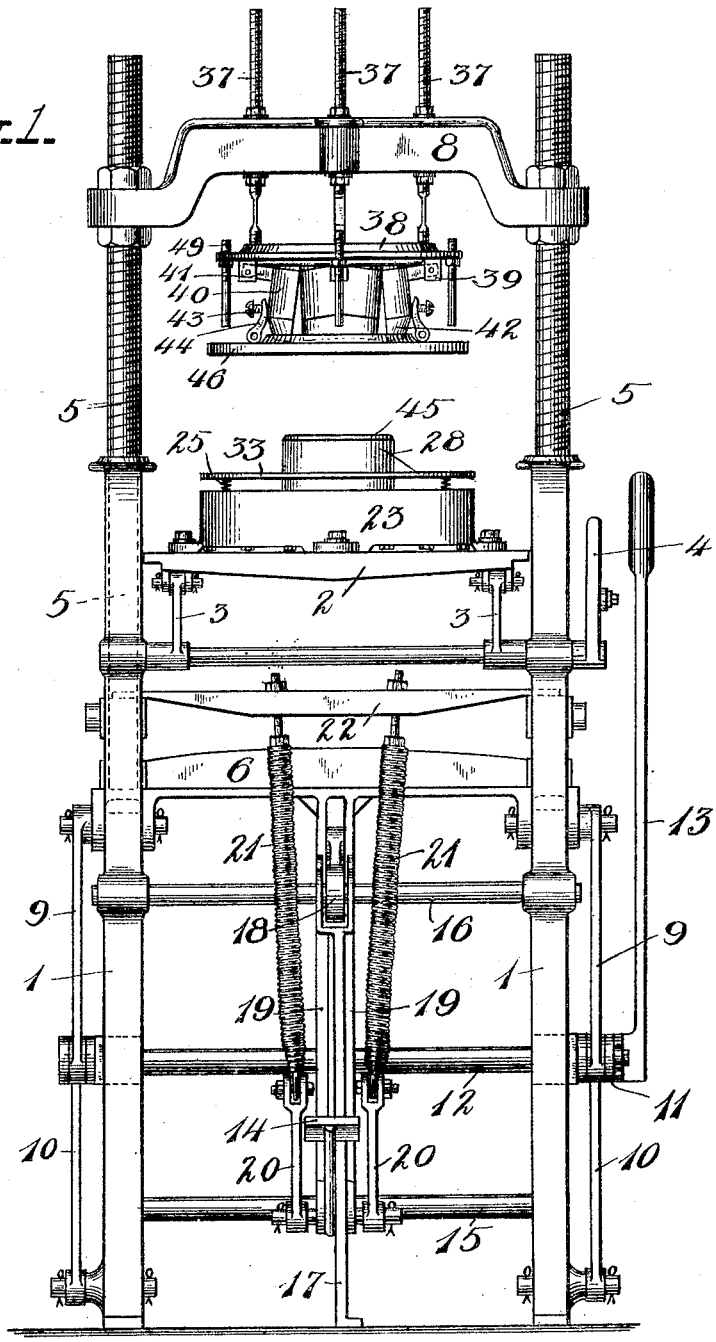

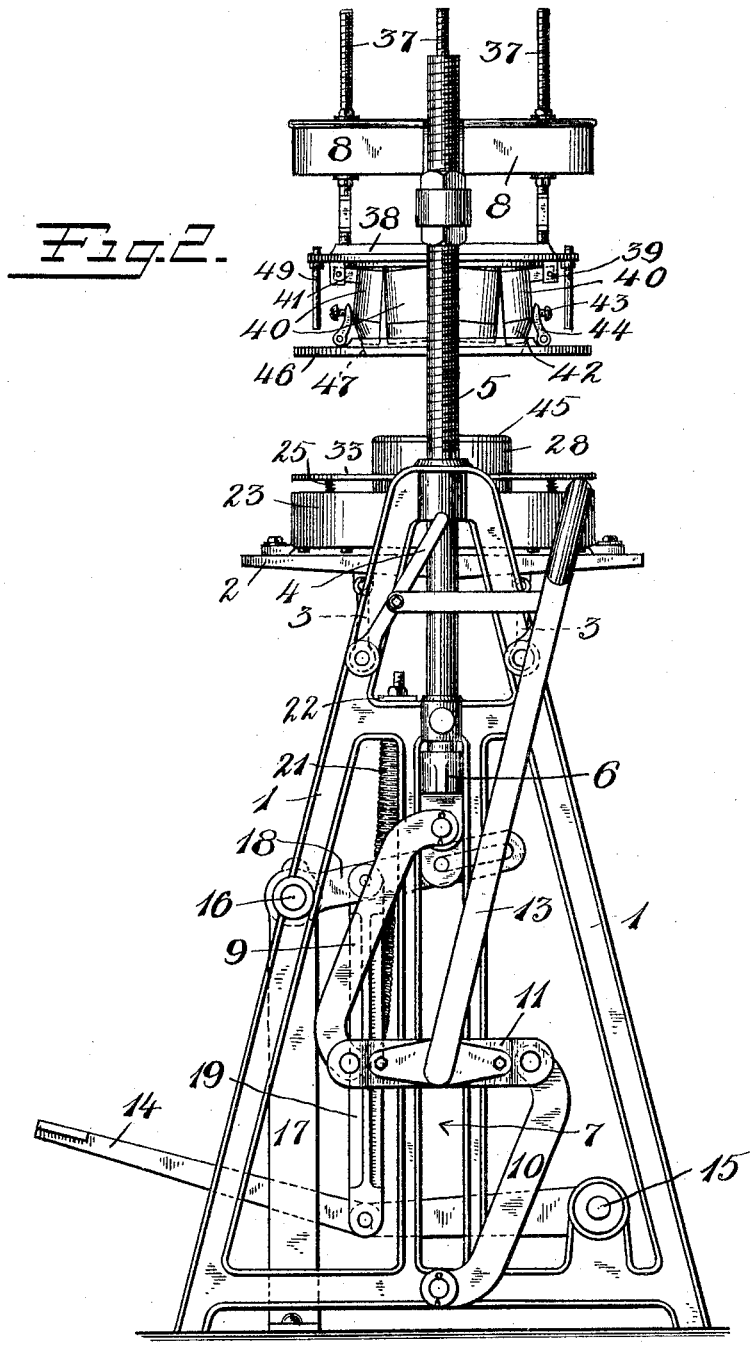

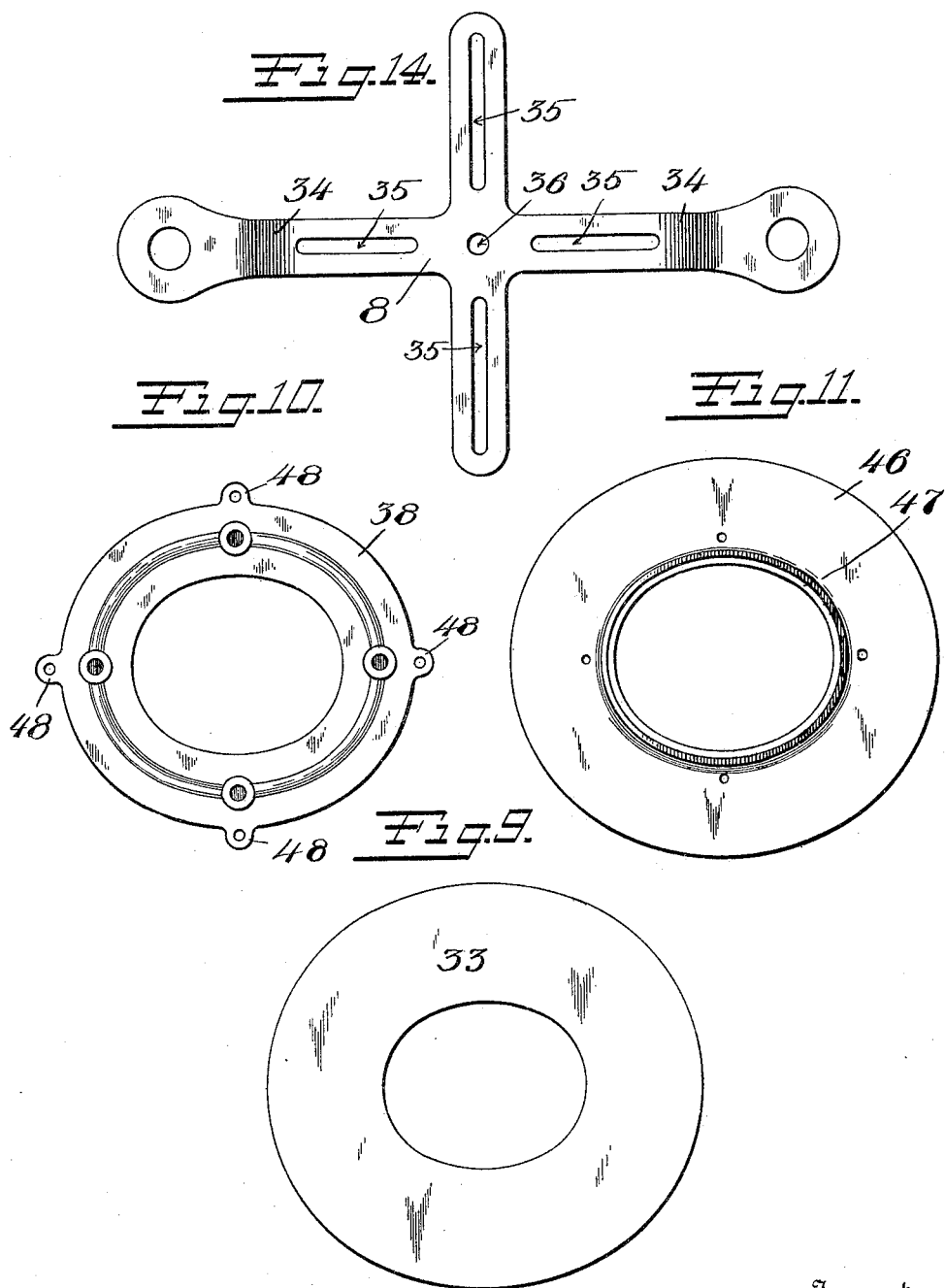

UNITED STATES PATENT OFFICE.

HERBERT L. STEVENS, OF GLEN RIDGE, NEW JERSEY.

HAT SHAPING AND FORMING MACHINE.

1,103,096.  Specification of Letters Patent.  Patented July 14, 1914.

Application filed April 10, 1913. Serial No. 760,195.

*To all whom it may concern:*

Be it known that I, HERBERT L. STEVENS, a citizen of the United States, residing at Glen Ridge, Essex county, State of New Jersey, have invented certain new and useful Improvements in Hat Shaping and Forming Machines, of which the following is a full, clear, and exact description.

This invention relates to hat shaping and forming machines, and more particularly to pressing and forming means therefor.

My invention, in a generic sense, is designed to produce a shaping and forming mechanism which admits of easy and expeditious manipulation and which will produce a formed hat of predetermined shape and contour with clean cut and distinct outline and without roughness and unevenness at the junction lines of the parts. These and other advantages and objects will appear from the detailed description following and from the drawings forming a part hereof and illustrating a preferred embodiment of my invention.

In the drawings, Figure 1 is a front elevation of a pressing machine equipped with my invention, the upper die carrying frame and the die being shown in raised position. Fig. 2 is a side elevation of the press in the same position. Fig. 3 is a fragmentary front elevation, partly in section, showing the upper and lower die members in their operative hat shaping position. Fig. 4 is a top plan view of the steam box removed from its supporting table. Fig. 5 is a horizontal sectional view of the lower die member. Figs. 6 and 7 are respectively views in elevation of side and end sections of the upper die member. Fig. 8 is a top plan view of the assembled sections of the upper die. Fig. 9 is a plan view of the stripping plate. Fig. 10 is a top plan view of the die supporting plate. Fig. 11 is a top plan view of the gripping and pressing plate carried by the upper die member. Fig. 12 is a detail in plan and elevation of the slotted links connecting the upper die sections with the gripping and pressing plate. Fig. 13 is a detail in plan and elevation of the clamping button for the lower die member. Fig. 14 is a top plan view of the upper die carriage detached. Fig. 15 is an elevation of the crown top die plate.

Referring to the drawings by numerals, 1 indicates the side members of a supporting frame, and 2 a swinging table secured to said frame by pivoted links 3.

4 is an operating lever adapted, through suitable connections, to swing the table from an upper central position to a lower forward position.

5—5 represent die supporting rods traveling through vertical bearings on each side of the frame and secured at their lower ends to a cross head 6 operating in a vertical slot 7 in each member 1.

8 is a die carriage adjustably mounted on the upper ends of the rods 5—5.

The cross head 6 is vertically reciprocated in the guide 7 by a double toggle on each side of the frame, said toggle arrangement comprising the links 9 pivoted at one end to the cross head 6, the links 10 pivoted at one end to the side frame members 1, and the connecting bars 11 pivoted to the free ends of the links 9 and 10. Each of the connecting bars 11 is connected at the center to the corresponding bar on the other side of the frame by a shaft 12 which passes through the vertical slot 7 in the frame and forms a floating pivot for the bars 11.

13 is an operating bar for the toggle mechanism and is secured to the shaft 12.

14 is a treadle mounted on the shaft 15 which itself is mounted in the side members 1 at the rear end of the frame.

16 is a shaft mounted in the side members of the frame at the forward end of the machine. 17 is a central support for said shaft which acts also as a guide for the treadle 14.

18 is an arm pivoted at one end on the shaft 16 and suitably connected at the other end to the cross head 6.

19 is a pivoted link connecting the arm 18 with the treadle 14.

20 are links pivotally secured at one end to the treadle 14 at the junction of the links 19 therewith, and at their other ends to springs 21 which have their other ends secured to a cross-bar 22 extending transversely of the frame. These springs normally tend to hold the treadle raised; *i. e.* with the hat shaping die raised out of operative position.

By depressing either the treadle 14 or operating the lever 13, the upper die carrying frame will move downwardly. The frame and the raising and lowering mechanism therefor so far described represent an embodiment of a hat shaping press well known in the art, and I do not claim herein the specific structure of this press, having merely shown them as representing the type of press which I preferably employ with the hat shaping and forming mechanism which I shall now describe.

Bolted to the table 2 is a steam box 23 having its upper surface provided with a number of recesses 24 adapted to receive coiled springs 25. The upper surface of this box is also provided with positioning studs 26 and with a rotatable locking button 27 suitably secured to the steam box, as by a screw, and adapted to engage with and detachably hold to said steam box a lower die member 28 in the form of a crown shaping die. This lower die member is shaped exteriorly to correspond to the contour of the inside of the crown of the hat to be shaped and is formed as a box-like structure having its upper edge formed with an annular shoulder adapted to receive and support a removable top plate 29. The edge of the top plate and the inner edge of the box 28 are preferably beveled as shown. The bottom of this die member is provided with holes 30 registering with the positioning studs 26 and with an opening 31 shaped similarly to the head of the button 27. The inner bottom surface of this lower die, adjacent and on each side of the openings 31 therein, is formed with oppositely inclined raised cam surfaces 32, and the under side of the button 27 is provided with corresponding inclined surfaces 27ª. When the lower die member with its top plate removed is placed in position on the table 2 with the studs 26 registering with the holes 30, the button 27 projects through the aperture 31 and within the interior of the die, and may be turned until its inclined surfaces 27ª bind on the cam surface 32, thus locking the lower die member to the steam table. The top plate 29 may then be placed in position and the lower die member is completely assembled on the table.

A stripper plate 33, shaped to conform preferably to the contour of the top of the steam box and recessed to correspond to the external contour of the lower die member 28, is adapted to rest above the steam box 23 and closely around the base of the die member, the springs 25 normally holding this plate above the surface of the steam box. In constructing the die, allowance is made, of course, for the thickness of the stripping plate. The parts so far described comprise the lower section of the shaping apparatus. The upper section is constructed as follows:

The upper die carriage 8 is, as has been stated, adjustably mounted upon the threaded rods 5—5. This carriage 8 (Fig. 14) has its arms 34 apertured to fit over the threaded rods 5—5 and is provided with four slots 35 radiating from a central aperture 36. Adjustably mounted in and depending from the slotted portions of this carriage 8 are threaded rods 37 having their lower ends screwed into a die supporting plate 38. This plate is provided at its under side with a plurality of ears 39 to which are pivotally secured a plurality of upper die sections 40. These die sections are shown in detail in Figs. 6, 7 and 8 of the drawings, and comprise preferably two side and two end sections, as shown, each section being provided with an ear 41 by means of which it is hinged to the supporting plate 38. The inner faces of these die sections assembled, conform to and vary with the shape of the exterior of the crown of the hat which it is desired to form. The outer faces of these sections at their lower ends are formed with a bevel 42, the purpose of which will appear hereinafter.

Each die section, on its exterior above the beveled portion thereof, is provided with a stud or screw 43. These studs loosely engage in the slotted portions of links 44, the lower ends of which are bifurcated, and pivotally support between them the head of a stud or screw eye 45 which in turn carries a brim pressing and clamping plate 46. This plate (see Fig. 11) is centrally recessed, as shown, and is adapted to closely inclose the lower beveled ends of the die sections 40. The inner edge of this plate adjacent its recessed portion is formed with a bevel 47 corresponding to the bevel 42 on the die sections.

With the structure so far described it will be obvious that the plate 46, being loosely supported from the die sections 41 by means of the slotted links 44, is capable of movement relative thereto, such movement, because of the bevel on the die sections and on the inner edge of the plate, causing said die sections to move inwardly to assembled position. Depending from ears 48 formed on the die supporting plate 38 are threaded presser rods 49 adjustable in relation to said plate by means of the nuts shown. The lower ends of these rods, when the die sections and clamping plate are moved relative to each other, are designed and adapted to bear upon the upper surface of the clamping plate and impart pressure thereto.

The sectional upper die, the lower die, and the clamping plate so far described are designed to press and shape the brim and sides of the hat crown. I provide means in addition for pressing and shaping the top of the crown in the form of a crown plate 50 located within and between the die sections 40 and supported from the carriage 8 by a threaded rod 51 provided with adjusting means similar to those on the threaded rods 37. In addition I provide for further adjustment by forming the crown plate with a threaded sleeve or boss 52 with which the lower threaded end of the rod 51 engages and is held in adjusted position by a lock nut 53. The under surface of this crown plate 50 is, of course, shaped to correspond to the type of hat which it is desired to shape, its outer edges marking the junction line between the top and sides of the crown and closely engaging with the inner faces of the die sections when pressed into assembled position upon the hat which it is desired to shape.

The operation of the device is as follows: A hat, say for instance a straw hat with the crown stitched to the brim in the usual manner, is placed upon the lower die member 28 and a thin flexible brass band is placed around the crown. The foot treadle 14 is then operated to depress the upper die carrying frame. As this descends, the brim clamping and pressing plate 46 will first engage with the brim of the hat, pressing the stripping plate down upon the steam table and forcing the springs 25 down into their recesses. The die sections, by reason of their slotted connection with said plate, will continue to move downwardly, their beveled faces contacting with the beveled inner edge of the clamping plate and the sections being forced inwardly against the brass band around the hat to press the crown against the outer surface of the lower die 28. At the same time, the crown plate 50 will press upon the top of the hat and make it conform to the contour of the upper surface of the lower die member, while at the same time the rods 49 will press against the clamping plate 46, thus applying additional pressure to the brim of the hat. After the hat has been thus shaped, the upper die member with its pressing plate is raised from the lower die member, whereupon the stripper plate 33 will be forced upwardly from the steam table by the springs 25, stripping the formed hat from the lower die member. This is a very advantageous function, as formed hats are frequently distorted by being removed by hand from the lower die member.

I find that by reason of the increased pressure I am able to secure, by means of the wedging action of the beveled faces of the die sections and of the pressing plate, and by means of the adjustments for varying the pressure, a hat of clean cut appearance is produced with the junction lines of the parts clearly and smoothly defined. The brass band, which is first placed around the crown of the hat, serves to prevent the marring of the sides of the crown by the junction lines between the sections of the upper die.

It is, of course, understood that the upper and lower dies may be changed as desired to conform to various types of hat crowns.

What I claim is:

1. In a device of the character described, the combination of a lower die support, a lower die member thereon, an upper die support, an upper die member carried by said support and including a plurality of die sections mounted for movement relative to said support, means for moving one of said die members relative to and in operative engagement with the other, a brim clamping plate centrally apertured and encircling said upper die sections, said plate being loosely suspended from said sections and being movable relative thereto, the adjacent edges of said die sections and plate coöperating, whereby when said die members are moved into coöperating engagement, said plate moves relative to said die sections, thereby forcing said die sections into assembled shaping position relative to the lower die member.

2. In a device of the character described, the combination of a support, a lower die member thereon, an upper die support, an upper die member supported thereby and comprising a plurality of die sections movable relative thereto, a clamping plate inclosing said die sections and movable relative thereto, means for moving one of said die members relative to and into operative engagement with the other, coöperating parts on said plate and said die sections, adapted, when said die members are so moved, to force said die sections into assembled shaping position, and means automatically stripping a formed article from a die when said die members are disengaged.

3. In a device of the character described, the combination of a support, a lower die member secured thereto, an upper die support, an upper die member carried thereby and comprising a plurality of movable die sections having their exterior faces beveled, a relatively movable gripping and pressing plate associated with said die sections recessed to inclose the same and having its edges adjacent said recess correspondingly beveled and coöperating with said die sections, means for moving one of said die members relative to the other and into operative engagement therewith, and means automatically stripping the shaped article from a die member upon the disengagement of said die members.

4. In a device of the character described, the combination of a support, a lower die member secured thereto, an upper die support, an upper die member carried thereby and comprising a plurality of movable die sections pivotally supported and having their lower exterior faces beveled, a relatively movable gripping and pressing plate connected with said die sections and centrally recessed to inclose the lower beveled portion of the same and having its edges adjacent said recess correspondingly beveled and coöperating with said die sections, means for moving one of said die members relative to the other and into operative engagement therewith, means for applying pressure to said pressing plate, and means automatically stripping the shaped article from a die member upon the disengagement of said die members.

5. In a device of the character described, the combination of a stationary support, a lower die member secured thereto, an upper die support, a plurality of die sections pivotally supported thereby and having their lower exterior faces beveled, a relatively movable gripping and pressing plate connected to said die sections centrally recessed to inclose the same and having its adjacent edges correspondingly beveled and coöperating with said die sections, pressure applying connections between said movable support and said pressure plate, a top shaping plate within said die sections, means for moving said upper die sections and their connected parts relative to and into operative engagement with said lower die member, and means automatically stripping the shaped article from said lower die member when said upper die sections are moved from engaging position.

6. In a device of the character described, the combination of a stationary support, a lower crown forming die member secured thereto, a movable upper die support, a plurality of crown shaping die sections pivotally supported therefrom and having their lower exterior faces beveled, a brim gripping and pressing plate supported adjacent to and inclosing the lower portions of said die sections and movable relative thereto, said plate having its edges adjacent said die sections correspondingly beveled and coöperating therewith, means for moving said upper die sections and their connected parts into operative engagement with said lower die member and for applying pressure to said brim gripping plate, and means associated with said lower die member automatically stripping the formed hat therefrom when the upper die sections are moved out of engagement therewith.

7. In a device of the character described, the combination of a stationary support, a lower crown forming die member secured thereto, a movable upper die support, a plurality of crown shaping die sections pivotally supported therefrom and having their lower exterior faces beveled, a brim gripping and pressing plate supported adjacent to and inclosing the lower portions of said die sections and movable relative thereto, said plate having its edges adjacent said die sections correspondingly beveled and coöperating therewith, a top shaping die plate depending from said movable support and inclosed by said die sections, means for moving said upper die sections and their connected parts into operative engagement with said lower die member and for applying pressure to said brim gripping plate, and means associated with said lower die member automatically stripping the formed hat therefrom when the upper die sections are moved out of engagement therewith.

8. In a device of the character described, the combination of a stationary support, a lower crown forming die member secured thereto, a depressible stripper plate inclosing said lower die member, a movable carriage, a die carrying plate suspended therefrom, a plurality of upper crown shaping die segments pivotally supported from said plate and having the lower portions of their outer faces beveled, a brim gripping plate movably suspended from and inclosing the lower portions of said die segments and having its edges adjacent said segments correspondingly beveled and coöperating therewith, means carried by said die carrying plate for applying pressure to said brim gripping plate, means for reciprocating said carriage to bring said upper die members and their associated parts into operative hat shaping position on said lower die member, and means automatically lifting said stripper plate to strip the formed hat from said lower die member upon the withdrawal of the upper die sections.

9. In a device of the character described, the combination of a stationary support, a steam box thereon, a lower crown forming die member detachably positioned on said steam box, a stripper plate encircling said lower die member, springs located in recesses in said steam box and normally extending said stripper plate above the face thereof, a movable carriage above said steam box and die, an upper die carrying plate adjustably supported therefrom, a plurality of crown shaping upper die segments pivotally supported from the underside of said plate and having their lower outer faces beveled, a brim clamping plate movably suspended from said die segments and inclosing the lower ends thereof, the adjacent edges of said clamping plate being correspondingly beveled and coöperating with said die segments, adjustable pressure bars depending from said die plate and adapted to engage with said clamping plate, an adjustable crown top die plate suspended from said die carrying plate and inclosed by said die segments, means for moving said carriage and its connected parts relative to and into hat shaping engagement with said lower die, and means for raising said carriage from such engagement.

10. In a device of the character described, the combination of a lower die support, a lower die member thereon, an upper die support, an upper die member carried by said support and including a plurality of die sections mounted for movement relative to said support, means for moving one of said die members relative to and in operative engagement with the other, a brim clamping plate centrally apertured and encircling said upper die sections, said plate being loosely suspended from said sections and being movable relative thereto, the adjacent edges of said die sections and plate coöperating, whereby when said die members are moved into coöperating engagement, said plate moves relative to said die sections, thereby forcing said die sections into assembled shaping position relative to the lower die member, and pressure applying members carried by said upper die support and arranged to engage said brim clamping plate when the parts are moved to clamping position to impart pressure thereto.

11. In a device of the character described, the combination of a support, a lower die member secured thereto, an upper die support, an upper die member carried thereby and comprising a plurality of die sections movably supported, a clamping plate inclosing said die sections and movable relative thereto, means for moving one of said die members relative to and into operative engagement with the other, coöperating parts on said plate and said die sections, adapted, when said die members are so moved, to force said die sections into assembled shaping position, means for applying pressure to said clamping plate, and means automatically stripping a formed article from a die when said die members are disengaged.

HERBERT L. STEVENS.

Witnesses:
MARY E. GOUGH,
EMMA E. BROWN.

Copies of this patent may be obtained for five cents each, by addressing the "Commissioner of Patents, Washington, D. C."